UNITED STATES PATENT OFFICE.

NELSON ORCUTT, OF SYRACUSE, NEW YORK, ASSIGNOR TO DAVID D. GREGORY, OF SAME PLACE.

IMPROVEMENT IN THE MANUFACTURE OF SOAP.

Specification forming part of Letters Patent No. 97,220, dated November 23, 1869.

*To all whom it may concern:*

Be it known that I, NELSON ORCUTT, of Syracuse, Onondaga county, and State of New York, have invented certain new and useful Improved Composition in Making Soap; and I do hereby declare that the following is a full, clear, and exact description thereof, reference being had to the annexed specification.

In order to enable others to make my invention, I will describe the process of making as follows, viz:

I take one hundred and seventy-five pounds of tallow, one hundred and seventy-five pounds of sal-soda, or fifty-three pounds of soda-ash, (eighty per cent. strength,) eighty-seven and one-half pounds of rosin, forty-two pounds stone lime, three pounds of starch, one and one half pound of glue, and forty-two gallons of water. I take thirty-five gallons of the water and heat to 212° of heat; then put the lime into a tub and add sufficient boiling water to slake like a paste; then add the glue. I then dissolve the starch in two gallons of cold water; then put the remainder of the cold water with the lime-water to reduce it to about 150° of heat. I then put the soda into the kettle, and also the lime-water, and heat the whole to 212° of heat, which makes a caustic lye of 24° of strength. I then add my tallow and rosin, and boil the whole mass, which readily unites and becomes soap.

What I claim as my invention, and desire to secure by Letters Patent, is—

1. The improvement in soap-making, herein described, consisting in uniting glue or gelatine to soap compounds by means of starch, treated substantially as described.

2. The new article of soap made by the combination of alkali, fats, or rosin. and gelatine and starch, substantially as described.

This specification signed this 25th day of October, 1869.

NELSON ORCUTT.

Witnesses:
 ROBT. H. PARK,
 THOMAS MERRIAM.